United States Patent
Mun et al.

(10) Patent No.: US 9,805,437 B2
(45) Date of Patent: Oct. 31, 2017

(54) METHOD OF PROVIDING PREVIEW IMAGE REGARDING DISPLAY SETTING FOR DEVICE

(71) Applicant: Samsung Electronics Co., Ltd., Suwon-si, Gyeonggi-do (KR)

(72) Inventors: Tai Kuin Mun, Suwon-si (KR); Taeck Ki Lee, Siheung-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 106 days.

(21) Appl. No.: 14/630,060

(22) Filed: Feb. 24, 2015

(65) Prior Publication Data

US 2015/0242989 A1    Aug. 27, 2015

Related U.S. Application Data

(60) Provisional application No. 61/943,798, filed on Feb. 24, 2014.

(30) Foreign Application Priority Data

Jun. 26, 2014  (KR) .................. 10-2014-0078677

(51) Int. Cl.
  *G06T 1/20*    (2006.01)
  *G04G 21/04*  (2013.01)
  (Continued)

(52) U.S. Cl.
  CPC .............. *G06T 1/20* (2013.01); *G04G 21/00* (2013.01); *G04G 21/04* (2013.01); *G09G 5/006* (2013.01);
  (Continued)

(58) Field of Classification Search
  None
  See application file for complete search history.

(56) References Cited

U.S. PATENT DOCUMENTS 7,081,905 B1    7/2006  Raghunath
8,291,408 B1 *  10/2012 Czymontek ............... G06F 8/34
                                                    715/749

(Continued)

FOREIGN PATENT DOCUMENTS

GB    WO 2013097896    *  4/2013  ............... G06F 9/44
KR    10-2010-0130478 A   12/2010
WO    2013/097896 A1      7/2013

OTHER PUBLICATIONS

Qualcomm, Qualcomm Toq Smartwatch: User Manual: Getting Starting, Nov. 27, 2013, pp. 1-38, XP055198228, Qualcomm Connected Experiences, Inc. (Hereinafter Qualcomm).*

(Continued)

*Primary Examiner* — Maurice L McDowell, Jr.
*Assistant Examiner* — Donna J Ricks
(74) *Attorney, Agent, or Firm* — Jefferson IP Law, LLP

(57) ABSTRACT

A method of a first electronic device to display a preview image is provided. The method includes receiving, by the first electronic device, a user input for setting a screen of a second electronic device, transmitting, by the first electronic device, setting information based on the user input to the second electronic device, receiving, by the first electronic device, the preview image from the second electronic device, and displaying, by the first electronic device, the received preview image, wherein the preview image is for the screen of the second electronic device.

15 Claims, 6 Drawing Sheets

(51) Int. Cl.
*G09G 5/00* (2006.01)
*G04G 21/00* (2010.01)
*H04M 1/725* (2006.01)
*G06F 1/16* (2006.01)

(52) U.S. Cl.
CPC ..... *H04M 1/7253* (2013.01); *H04M 1/72563* (2013.01); *G06F 1/163* (2013.01)

(56) References Cited

U.S. PATENT DOCUMENTS

| | | |
|---|---|---|
| 2006/0123335 A1 | 6/2006 | Sanchez et al. |
| 2012/0162536 A1 | 6/2012 | Sibilsky et al. |
| 2012/0282914 A1 | 11/2012 | Alexander |
| 2014/0304612 A1 | 10/2014 | Collin |

OTHER PUBLICATIONS

Qualcomm, Qualcomm Toq Smartwatch: User Manual: Getting Started, Nov. 27, 2013, pp. 1-38, XP055198228, Qualcomm Connected Experiences, Inc.

* cited by examiner

METHOD OF PROVIDING PREVIEW IMAGE REGARDING DISPLAY SETTING FOR DEVICE

CROSS-REFERENCE TO RELATED APPLICATION(S)

This application claims the benefit under 35 U.S.C. §119(e) of a U.S. Provisional application filed on Feb. 24, 2014 in the U.S. Patent and Trademark Office and assigned Ser. No. 61/943,798, and under 35 U.S.C. §119(a) of a Korean patent application filed on Jun. 26, 2014 in the Korean Intellectual Property Office and assigned Serial number 10-2014-0078677, the entire disclosure of each of which is hereby incorporated by reference.

TECHNICAL FIELD

The present disclosure relates to an electronic device and a method performed by the electronic device to provide a user with a preview image on a screen setting for another electronic device.

BACKGROUND

Recently, with the developments of information communication technologies, network devices such as base stations are installed throughout the country and users make calls, send/receive texts message, and transmit/receive data with other users via networks.

An electronic device may transmit/receive data to/from another electronic device using a base station or may transmit/receive data using a different technique. For example, an electronic device may transmit/receive data to/from another electronic device without a base station by using a short range network such as Radio Frequency Identification (RFID), Near Field Communication (NFC), and Zigbee®.

Recently, in the One Person Multi Device (OPMD) environment in which one user uses several devices, the user may own various electronic devices such as a computer, a notebook computer, a smartphone, a smart pad, and a wearable device (for example, a smart watch or a smart glass). That is, the above-mentioned electronic devices may be owned by the same user. For example, a user may pair a user's smartphone and wearable device by using the above-mentioned short range network and use them together.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide the user with a preview image generated, by a first electronic device, based on a user input for a screen setting of a second electronic device. The user input is received from a user of the first electronic device.

In accordance with an aspect of the present disclosure, a method of a first electronic device to display a preview image is provided. The method includes receiving, by the first electronic device, a user input for setting a screen of a second electronic device, transmitting, by the first electronic device, setting information based on the user input to the second electronic device, receiving, by the first electronic device, the preview image from the second electronic device, and displaying, by the first electronic device, the received preview image, wherein the preview image is for the screen of the second electronic device.

In accordance with another aspect of the present disclosure, a method of a second electronic device to generate a preview image is provided. The method includes receiving, by the second electronic device, setting information from a first electronic device, generating, by the second electronic device, a preview image based on the received setting information, and transmitting, by the second electronic device, the generated preview image to the first electronic device.

In accordance with another aspect of the present disclosure, a first electronic device displaying a preview image is provided. The device includes an input module configured to receive a user input for setting a screen of a second electronic device, a control module configured to generate setting information on the screen of the second electronic device on the basis of the user input, a communication module configured to transmit the generated setting information to the second electronic device and receive the preview image from the second electronic device, and a display module configured to display the received preview image, wherein the preview image is for the screen of the second electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
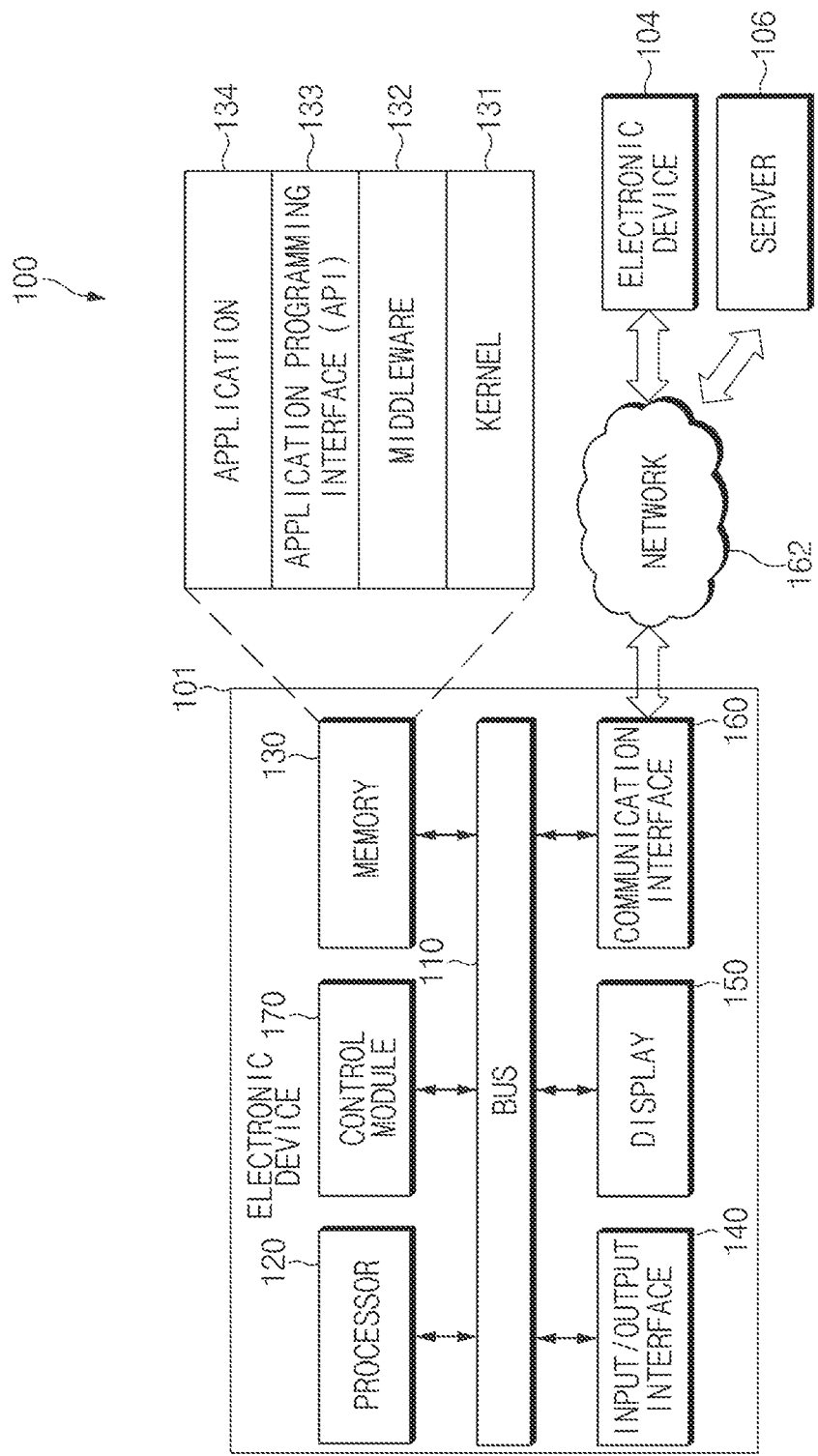
FIG. 1 is a block diagram illustrating a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," "including," or "comprising," specifies a property, a region, a fixed number, a step, a process, an element and/or a component but does not exclude other properties, regions, fixed numbers, steps, processes, elements and/or components. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, the expression "or" includes any or all combinations of words listed. For example, "A or B" may include A or include B or include both A and B.

The terms such as "1st", "2nd", "first", "second", and the like used herein may refer to modifying various different elements of various embodiments of the present disclosure, but do not limit the elements. For instance, such terms do not limit the order and/or priority of the elements. Furthermore, such terms may be used to distinguish one element from another element. For instance, both "a first electronic device" and "a second electronic device" are all electronic devices but indicate different electronic devices. For example, a first component may be referred to as a second component and vice versa without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Terms used in this specification are used to describe specific embodiments, and are not intended to limit the scope of the present disclosure.

Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to various embodiments of the present disclosure may be a device displaying an image on a screen that will be displayed on a screen of another electronic device, which will be described with reference to FIGS. 1 to 6. For example, an electronic device may include at least one of smartphones, smart pads, tablet personal computers (PCs), mobile phones, video phones, e-book readers, desktop PCs, laptop PCs, netbook computers, personal digital assistants (PDAs), portable multimedia players (PMPs), digital audio players, mobile medical equipment, cameras, or wearable devices (for example, head-mounted-devices (HMDs) such as electronic glasses, electronic clothing, electronic bracelets, electronic necklaces, accessories, electronic tattoos, or smartwatches).

According to various embodiments of the present disclosure, an electronic device may be a smart home appliance displaying an image that will be displayed on a screen of another electronic device. The smart home appliances may include at least one of, for example, a television (TV), digital video disk (DVD) players, audio players, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to an embodiment of the present disclosure, an electronic device may include at least one of various medical devices displaying an image that will be displayed on a screen of another electronic device (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and stores' point of sales (POS).

According to an embodiment of the present disclosure, an electronic device may include at least one of furniture or buildings/structures displaying an image that will be displayed on a screen of another electronic device, electronic boards, electronic signature receiving devices, projectors, or various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, an electronic device according to various embodiments of the present disclosure will be described in more detail with reference to FIGS. 1 to 6. The term "user" in various embodiments of the present disclosure may refer to a person using an electronic device or a device using an electronic device (for example, an artificial intelligent electronic device).

FIG. 1 is a block diagram illustrating a network environment including an electronic device according to various embodiments of the present disclosure.

Referring to FIG. 1, a network environment 100 may include an electronic device 101 having a bus 110, a processor 120, a memory 130, an input/output interface 140, a display 150, a communication interface 160, and a control module 170.

The bus 110 may be a circuit connecting the above-mentioned components to each other and delivering a communication signal (for example, a control message) therebetween.

The processor 120, for example, receives an instruction from the above other components (for example, the memory 130, the input/output interface 140, the display 150, the communication interface 160, or the control module 170) through the bus 110, interprets the received instruction, and performs operations and data processing in response to the interpreted instruction.

The memory 130 may store an instruction or data received from the processor 120 or other components (for example, the input/output interface 140, the display 150, the communication interface 160, or the control module 170) or an instruction or data generated from the processor 120 or other components. The memory 130, for example, may include programming modules, for example, a kernel 131, a middleware 132, an application programming interface (API) 133, and an application 134. Each of the above-mentioned programming modules may be configured with software, firmware, hardware, or a combination thereof.

The kernel 131 may control or manage system resources (for example, the bus 110, the processor 132, or the memory 133) used for performing operations or functions, for example, the middleware 134, the API 120, or the application 130. Additionally, the kernel 131 may provide an interface for accessing an individual component of the electronic device 101 from the middleware 132, the API 133, or the application 134 and controlling or managing the individual component.

The middleware 132 may serve as an intermediary role for exchanging data between the API 133 or the application 134 and the kernel 131 through communication. Additionally, in relation to job requests received from the applications 132, the middleware 134 may perform a control (for example, scheduling or load balancing) for the job requests by using a method of assigning a priority for using a system resource (for example, the bus 101, the processor 110, or the memory 134) of the electronic device 101 to at least one application among the applications 120.

The API 133, as an interface through which the application 134 controls a function provided from the kernel 131 or the middleware 132, may include at least one interface or function (for example, an instruction) for file control, window control, image processing, or character control.

According to various embodiments of the present disclosure, the application 134 may include a short message service (SMS)/multimedia messaging service (MMS) application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 134 may be an application relating to information exchange between the electronic device 101 and an external electronic device (for example, the electronic device 104 or the server 106). The application relating to information exchange, for example, may include a notification relay application for delivering specific information to the external electronic device or a device management application for managing the external electronic device.

For example, the notification relay application may have a function for delivering information from another application (for example, an SMS/MMS application, an e-mail application, a health care application, or an environmental information application) to an external electronic device. The electronic device 101 may include at least one application 134 such as, for example, a notification relay application, a device management application, and so forth. The notification relay application may receive notification information from an external electronic device and may then provide the received notification information to a user. The device management application, for example, may manage (for example, install, delete, or update) a function (for example, turning on/off an external electronic device itself (or some components) or adjusting the brightness (or resolution) of a display) for at least part of an external electronic device communicating with the electronic device 101, an application operating in the external electronic device, or a service (for example, a call service or a message service) provided from the external electronic device.

According to various embodiments of the present disclosure, the application 134 may include an application specified according to the attribute (for example, a type of an electronic device) of the external electronic device. For example, when an external electronic device is a digital audio player, the application 134 may include an application relating to music playback. Similarly, when an external electronic device is a mobile medical device, the application 134 may include an application relating to heath care. According to an embodiment of the present disclosure, the application 134 may include at least one of an application specified to the electronic device 101 or an application received from an external electronic device.

The input/output interface 140 may deliver an instruction or data inputted from a user through an input/output device (for example, a sensor, a keyboard, or a touch screen), to the processor 120, the memory 130, the communication interface 160, or the control module 170 through the bus 110. For example, the input/output interface 140 may provide data on a user's touch inputted through a touch screen to the processor 120. Additionally, the input/output interface 140 may output an instruction or data received from the processor 120, the memory 130, the communication interface 160, or the control module 170 through the bus 130, through the input/output device (for example, a speaker or a display). For example, the input/output interface 140 may output voice data processed through the processor 120 to a user through a speaker.

The display 150 may display information (for example, multimedia data or text data) to a user.

The communication interface 160 may connect a communication between the electronic device 101 and an external device (for example, the electronic device 104 or the server 106). For example, the communication interface 160 may communicate with the external device in connection to the network 162 through wireless communication or wired communication. The wireless communication may include at least one of wireless fidelity (WiFi), Bluetooth (BT), Bluetooth low energy (BLE), near field communication (NFC), GPS, or cellular communication (for example, third generation (3G), long term evolution (LTE), LTE-advanced (LTE-A), code division multiple access (CDMA), wideband CDMA (WCDMA), universal mobile telecommunications service (UMTS), wireless broadband (WiBro), or global system for mobile communications (GSM)). The wired communication may include at least one of universal serial bus (USB), high definition multimedia interface (HDMI), recommended standard 232 (RS-232), or plain old telephone service (POTS), for example.

According to an embodiment of the present disclosure, the network 162 may be telecommunications network. The telecommunications network may include at least one of computer network, Internet, Internet of things, or telephone network. According to an embodiment of the present disclosure, a protocol (for example, transport layer protocol, data link layer protocol, or physical layer protocol) for communication between the electronic device 101 and an external device may be supported by at least one of the application 134, the application programming interface 133, the middleware 132, the kernel 131, or the communication interface 160.

The control module 170 may process at least part of information obtained from other components (for example, the processor 120, the memory 130, the input/output interface 140, or the communication interface 160) and may output it to a user through various methods. For example, the processor 120 may receive a user input event for setting a screen of the electronic device 104 and the control module 170 may generate screen setting information (data) on the basis of the user input event. The generated screen setting information may be transmitted to the electronic device 104 through the network 162 and the electronic device 104 may set a screen of the electronic device 104 to corresponding to the screen setting information. In this case, the electronic device 104 may capture a set screen to transmit it as a preview image to the electronic device 101 and the electronic device 101 may display the received preview image on the display 150.

According to an embodiment of the present disclosure, the server 106 may support the driving of the electronic device 101 by performing at least one of operations (or functions) implemented in the electronic device 101. For example, the server 106 may include a control server module supporting the control module 170. For example, the server module may include at least one component of the control module 170 and may perform (for example, handle) at least one operation among operations that the control module 170 performs.

Figure 2:
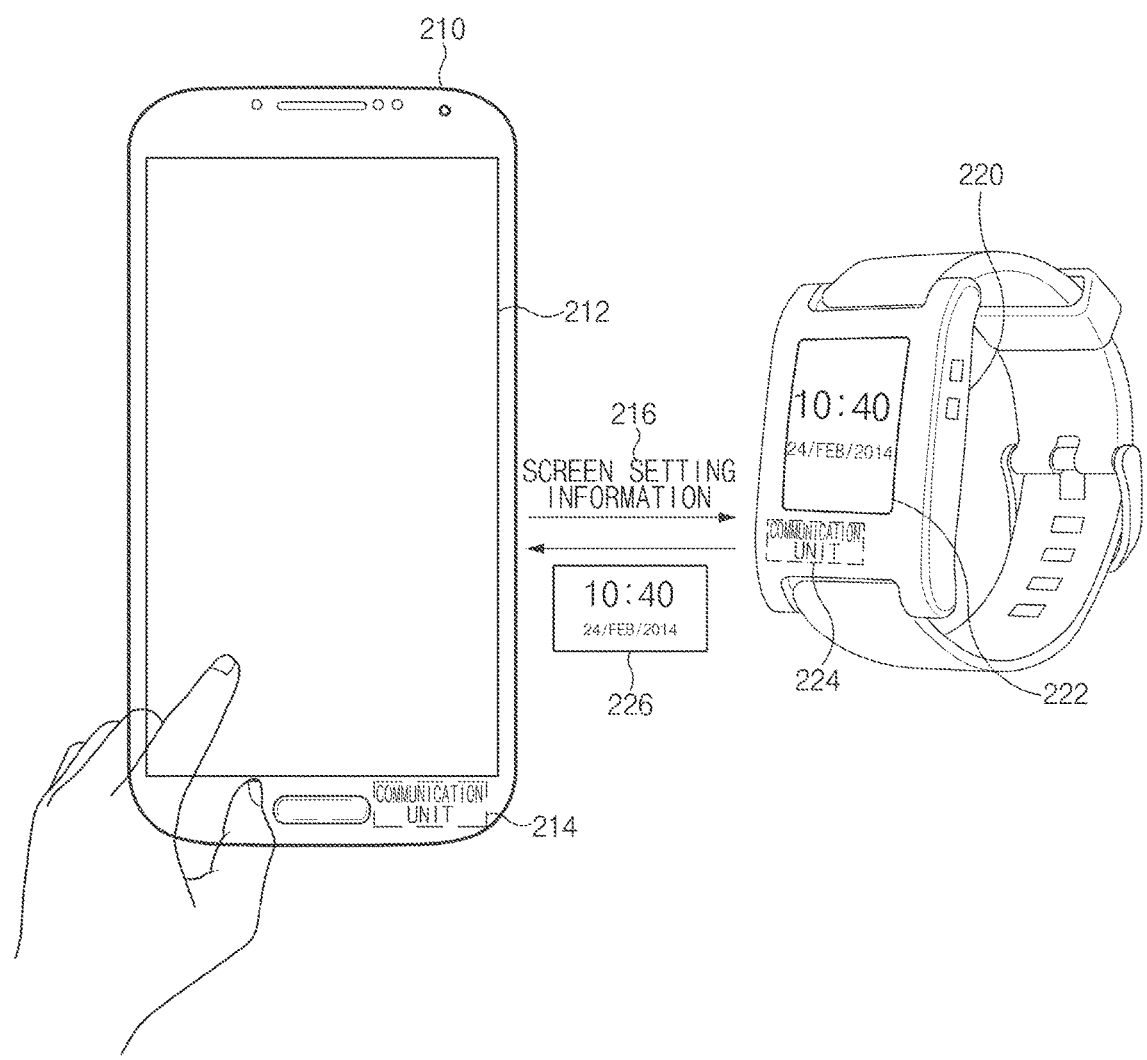
FIG. 2 is a configuration diagram of a preview image providing system according to various embodiments of the present disclosure.

FIG. 2 is a configuration diagram of a preview image providing system according to various embodiments of the present disclosure.

Referring to FIG. 2, the preview image providing system may include a first electronic device 210 and a second electronic device 220. However, since such a preview image providing system of FIG. 2 is just at least one embodiment of the present disclosure, the present disclosure is not interpreted as being limited through FIG. 2.

According to various embodiments of the present disclosure, the first electronic device 210 may be a smartphone and the second electronic device 220 may be a wearable device (for example, a smart watch). Furthermore, the first electronic device 210 and the second electronic device 220, as electronic devices owned by a single user, may mutually cooperate through the account or international mobile subscriber identity (IMSI) of the single user. For example, the first electronic device 210 may be Galaxy S or Galaxy Note that is a smartphone of Samsung Electronics and the second electronic device 220 may be Galaxy gear or Galaxy Fit (for example, a companion device of Galaxy Note) that is a smart watch of Samsung Electronics.

A user may directly set a screen to be displayed on a screen 222 of the second electronic device 220, on the second electronic device 220. Additionally, a user may set a screen to be displayed on the screen 222 by using the first electronic device 210. In case that the second electronic device 220 is apart from the first electronic device 210, the user may not know, via the second electronic device 220, how the screen of the second electronic device 220 is set by the user. Accordingly, the first electronic device 210 may display a screen configuration to be displayed or displayed on the screen 222, as a preview image, on the screen 212 of the first electronic device 210. Hereinafter, the operation that the first electronic device 210 displays the preview image will be described.

The first electronic device 210 may display a User Interface (UI) for setting the screen of the second electronic device 220 on a screen (for example, a touch panel) 212 of the first electronic device 210. A user may input a user input for setting the screen of the second electronic device 220 on the screen 212 by using the user's finger or an electric pen (for example, stylus). The first electronic device 210 may generate screen setting information corresponding to a screen setting of the second electronic device 220 on the basis of the user input. Herein, the screen setting may include setting at least one of a date, a time, a font, a color, and a shortcut application (favorite application), etc., which are displayed on the screen 222 of the second electronic device 220. Additionally, the user input may be described as a touch input for the screen 212 of the first electronic device 210 but is not limited thereto and may relate to a physical button equipped at the front, side, or rear of the first electronic device 210.

A communication unit 214 of the first electronic device 210 may transmit screen setting information 216 of the second electronic device 220 to a communication unit 224 of the second electronic device 220. At this point, the screen setting information 216 may be transmitted from the first electronic device 210 to the second electronic device 220 through the network 162. For example, when the first electronic device 210 and the second electronic device 220 are paired through BT, the screen setting information 216 may be transmitted from the first electronic device 210 to the second electronic device 220 through a BT network connection. According to various embodiments of the present disclosure, the screen setting information 216 may be transmitted from the first electronic device 210 to the second electronic device 220 through any suitable network such as a cellular network (e.g., 3G or LTE) or a WiFi network. Hereinafter, the case that the screen setting information 216 is transmitted from the first electronic device 210 to the second electronic device 220 through a BT network will be described as an example.

The second electronic device 220 may display the set screen by applying the received screen setting information 216. For example, the second electronic device 220 may parse the screen setting information 216 in extensible markup language (xml) format to apply it to the second electronic device 220.

At this point, the second electronic device 220 may generate a preview image 226 by capturing the displayed setting screen. The communication unit 224 of the second electronic device 220 may transmit the generated preview image 226 to the first electronic device 210. The preview image may be an image encoded to fit a screen resolution of the first electronic device 210 (for example, Base64 type byte array data). Similar to the screen setting information 216, the preview image 226 may be transmitted from the second electronic device 220 to the first electronic device 220 through a BT network connection.

According to various embodiments of the present disclosure, the second electronic device 220 may generate the preview image 226 without displaying a screen corresponding to a user input on the actual screen 222 by virtually applying the received screen setting information 216.

The first electronic device 210 may receive the preview image 226 through the communication unit 214 and may display the received preview image 226 on the screen 212. Then, when a user inputs a new user input in the UI for setting the screen of the second electronic device 220, the first electronic device 210 may display a preview image corresponding to the new user input on the screen 212.

Hereinafter, an operation of the first electronic device 210 of FIG. 2 will be described in more detail.

Figure 3:
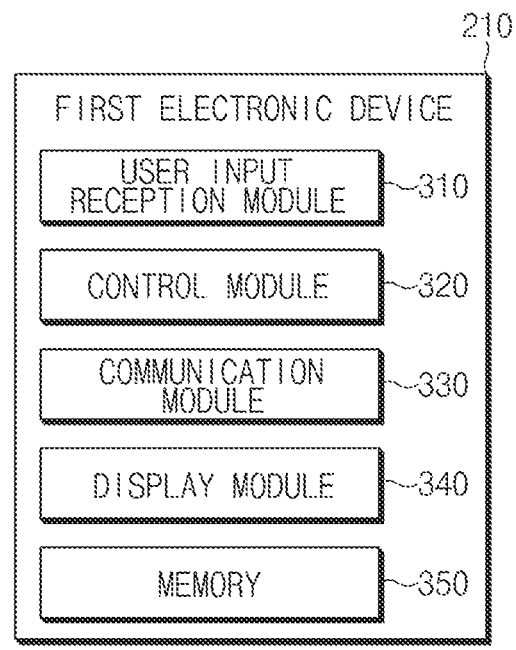
FIG. 3 is a configuration diagram of the first electronic device according to various embodiments of the present disclosure.

FIG. 3 is a configuration diagram of the first electronic device according to various embodiments of the present disclosure.

Referring to FIG. 3, the first electronic device 210 may include a user input reception module 310, a control module 320, a communication module 330, a display module 340, and a memory 350. However, the first electronic device 210 shown in FIG. 3 is just one embodiment of the present disclosure and its various modifications are possible. For example, the first electronic device 210, as a UI for receiving a certain command or information from a user, may further include an input device such as a keyboard and a mouse.

The user input reception module 310 may receive a user input for setting a screen to be displayed on the screen 222 of the second electronic device 220. In various embodiments of the present disclosure, the user input reception module 310 may be a touch screen module combined with the screen 212.

The control module 320 may generate screen setting information on the screen of the second electronic device 220 based on user input that is received from the user input reception module 310. The screen setting information may be data for requesting a screen setting corresponding to the user input from the second electronic device 220. Or, the screen setting information may be data for requesting a preview image on a screen corresponding to the user input. The screen setting information may include identification information of the second electronic device 220 and/or user identification information of the second electronic device 220. The screen setting information may be an xml file. Additionally, as mentioned above, since the screen setting information may be transmitted from the first electronic device 210 to the second electronic device 220 through BT, it may correspond to a BT network protocol.

The communication module 330 may transmit screen setting information generated by the control module 320 to the second electronic device 220. Additionally, the communication module 330 may receive the preview image from the second electronic device 220. The preview image may be an image on a screen displayed or to be displayed on the screen 222 on the basis of the transmitted screen setting information. Additionally, the preview image may correspond to a BT network protocol like the screen setting information. The preview image may be an image encoded, by the second electronic device 220, to correspond to a screen resolution of the first electronic device 210. The control module 320 may decode the received preview image to display it on the screen 212 of the first electronic device 210.

The display module 340 may display a user interface (UI) for setting a screen on the screen 222.

The display module 340 may display the preview image received through the communication module 330 on the screen 212 of the first electronic device 210.

The memory 350 may store data. The data stored in the memory 350 may include data inputted/outputted between each of components in the first electronic device 210. Furthermore, the data stored in the memory 350 may include data inputted/outputted between the first electronic device 210 and an external component (for example, the second electronic device 220). For example, the memory 350 may store the screen setting information generated by the control module 320. Additionally, the memory 350 may store the preview image received by the communication module 330.

It is apparent to those skilled in the art that the user input reception module 310, the control module 320, the communication module 330, the display module 340, and the memory 350 may be implemented separately or at least one component may be implemented integrally.

Figure 4:
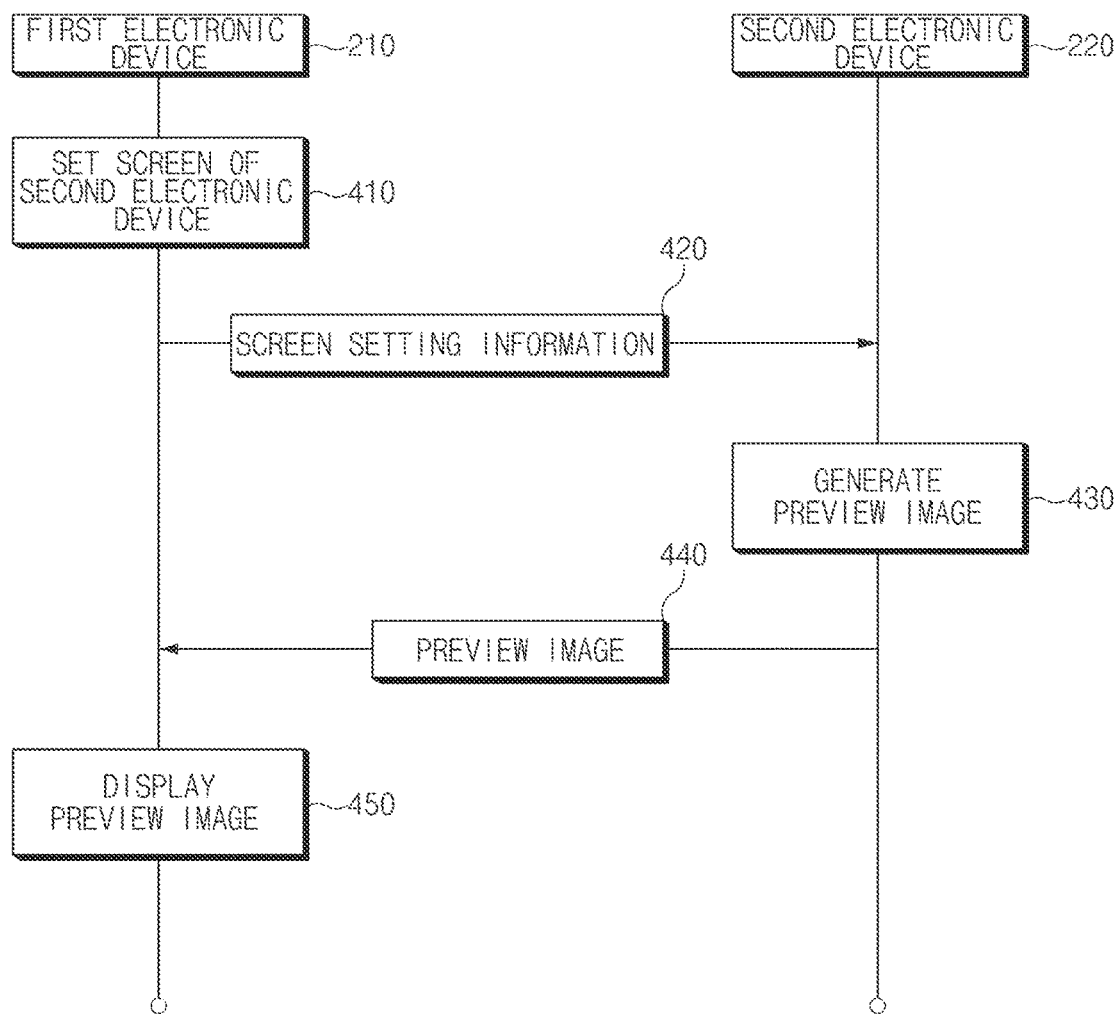
FIG. 4 is a flowchart illustrating a method of displaying a preview image according to various embodiments of the present disclosure.

FIG. 4 is a flowchart illustrating a method of displaying a preview image according to various embodiments of the present disclosure.

Referring to FIG. 4, a method of displaying a preview image includes time-series processed operations in the first electronic device 210 and the second electronic device 220 according to the embodiments shown in FIGS. 1 to 3. Accordingly, even if contents are omitted below, contents described in relation to the first electronic device 210 and the second electronic device 220 of FIGS. 1 to 3 may be applied to the method of displaying a preview image according to the embodiment of FIG. 4.

In operation 410, the first electronic device 210 may receive a user input for setting a screen to be displayed on the screen 222 and may generate screen setting information on the basis of the user input. The user input may be input on a UI executed on the first electronic device 210 to set the screen 222 of the second electronic device 220.

In operation 420, the first electronic device 210 may transmit the screen setting information to the second electronic device 220.

In operation 430, the second electronic device 220 may receive the screen setting information and may then generate the preview image on the basis of the received screen setting information. According to various embodiments of the present disclosure, the second electronic device 220 may set the screen of the second electronic device 220 on the basis of the received screen setting information and in this case, the preview image may be generated by capturing the set screen.

According to various embodiments of the present disclosure, the second electronic device 220 may display the screen and, in this case, the preview image may be for the virtually displayed on the second electronic device 220. At this point, when the second electronic device 220 additionally receives, from the first electronic device 210, a request for setting the preview image as the screen of the second electronic device 220, the second electronic device 220 may set the preview image as the screen of the second electronic device 220.

In operation 440, the second electronic device 220 may transmit the generated preview image to the first electronic device 210.

In operation 450, the first electronic device 210 may receive the preview image 226 and may display the preview image on the screen 212. For example, the preview image may be displayed on the UI described in operation 410.

The order of operations 410 to 450 of FIG. 4 is just an example and thus the present disclosure is not limited thereto. That is, the order between the above-mentioned operations may vary and some of the operations may be performed simultaneously. Additionally, the above mentioned operations may be repeated periodically at each predetermined time and may be performed again on the basis of a user input.

Hereinafter, a preview image displayed by the first electronic device 210 will be descried in more detail.

Figure 5:
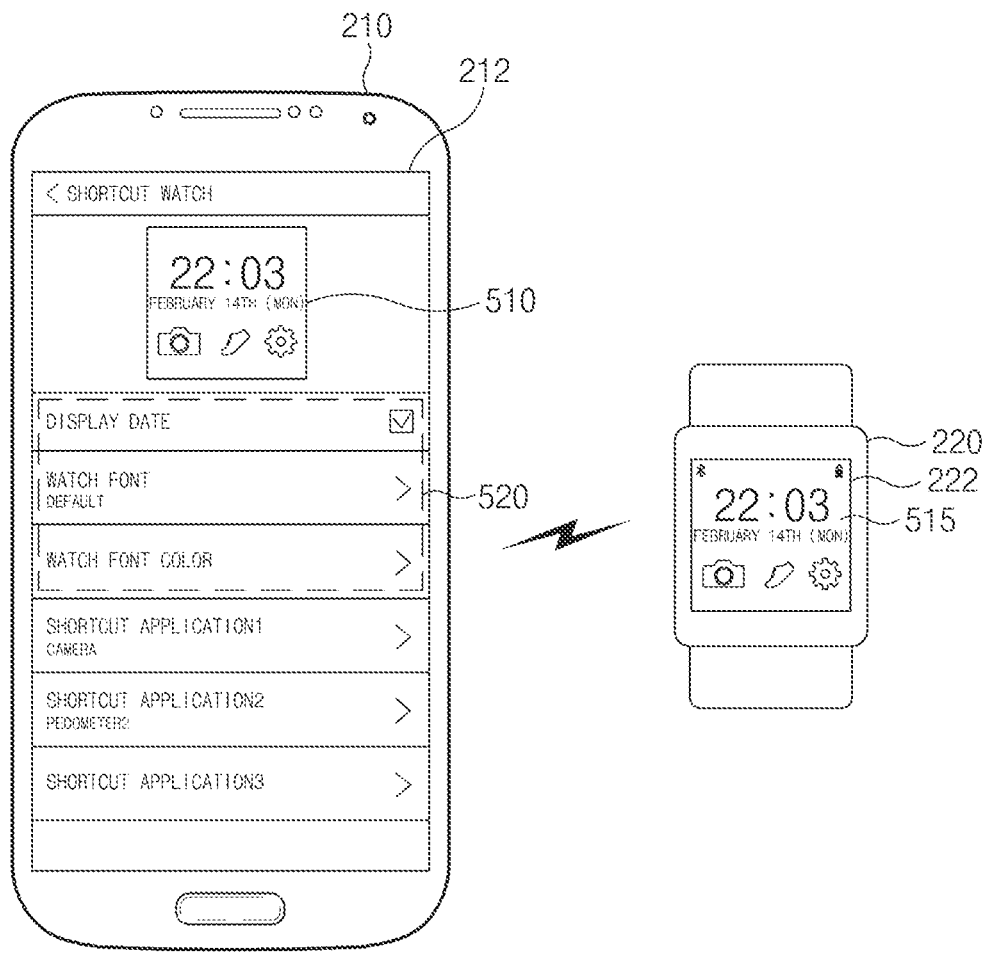
FIG. 5 is a view illustrating a preview image displayed on a screen of the first electronic device according to various embodiments of the present disclosure.

FIG. 5 is a view illustrating a preview image displayed on a screen of the first electronic device according to various embodiments of the present disclosure.

Referring to FIG. 5 a preview image 510 is being displayed on the screen 212 of the first electronic device 210. The preview image 510 previews a screen 515 that is or will be displayed on the screen 222 of the second electronic device 220. The screen 515 may be set by using a UI 520 of the second electronic device 220. For example, a user may cause the first electronic device 210 to generate screen setting information for setting the screen to be displayed on the screen 222 using the UI 520, and then to transmit the generated screen setting information to the second electronic device 220.

A method of a first electronic device to display a preview image according to various embodiments of the present disclosure may include: receiving a user input for setting a screen of a second electronic device, transmitting setting information based on the user input to the second electronic device; receiving the preview image from the second electronic device; and displaying the received preview image. At this point, the preview image may be for the screen of the second electronic device.

The preview image according to various embodiments of the present disclosure may be for a screen set in the second electronic device based on the user input.

The user input according to various embodiments of the present disclosure may set at least one of a date, a time, a font, and a color, which are displayed on the screen of the second electronic device.

According to various embodiments of the present disclosure, the first electronic device may be a smartphone and the second electronic device may be a wearable device. Additionally, the first electronic device and the second electronic device may be mutually cooperating electronic devices for a single user.

A method of a second electronic device to generate a preview image according to various embodiments of the present disclosure may include: receiving setting information from a first electronic device; generating a preview image on the basis of the received setting information; and transmitting the generated preview image to the first electronic device.

According to various embodiments of the present disclosure, the setting information may be an xml file for requesting a screen setting of the second electronic device.

A method of a second electronic device to generate a preview image according to various embodiments of the present disclosure may further include setting the screen of the second electronic device on the basis of the received setting information. At this point, the preview image may be generated by capturing the set screen.

A method of a second electronic device to generate a preview image according to various embodiments of the present disclosure may further include virtually displaying the screen of the second electronic device on a memory on the basis of the received setting information. At this point, the preview image may be for the virtually displayed screen of the second electronic device.

A method of a second electronic device to generate a preview image according to various embodiments of the present disclosure may include receiving a request for setting the preview image as the screen of the second electronic device from the first electronic device, and setting the screen of the second electronic device in response to the received request.

According to various embodiments of the present disclosure, the first electronic device and the second electronic device may communicate with each other through BT.

A first electronic device displaying a preview image according to various embodiments of the present disclosure may include: a user input reception unit receiving a user input for setting a screen of a second electronic device; a management unit generating setting information on the screen of the second electronic device; a communication unit transmitting the generated setting information to the second electronic device and receiving the preview image from the second electronic device; and a display unit displaying the received preview image. At this point, the preview image may be for the screen of the second electronic device.

According to various embodiments of the present disclosure, the generated setting information may include identification information of the second electronic device and/or user identification information of the second electronic device.

Figure 6:
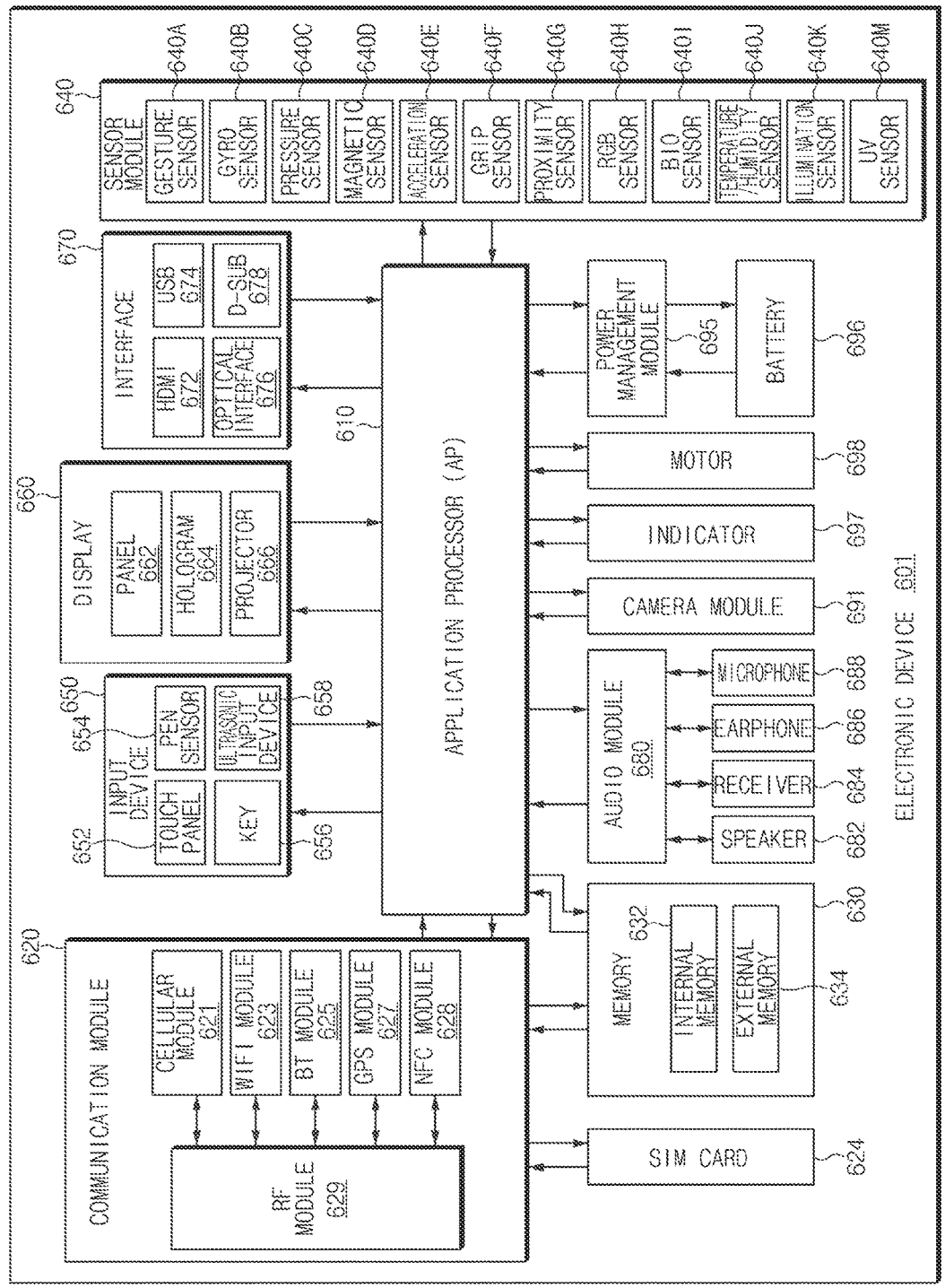
FIG. 6 is a block diagram of an electronic device according to various embodiments of the present disclosure.

FIG. 6 is a block diagram illustrating an electronic device according to various embodiments of the present disclosure.

Referring to FIG. 6, electronic device 601, for example, may configure all or part of the above-mentioned electronic device 101 shown in FIG. 1. Specifically, the electronic device 601 includes at least one application processor (AP) 610, a communication module 620, a subscriber identification module (SIM) card 624, a memory 630, a sensor module 640, an input device 650, a display 660, an interface 670, an audio module 680, a camera module 691, a power management module 695, a battery 696, an indicator 697, and a motor 698.

The AP 610 may control a plurality of hardware or software components connected to the AP 610 and also may perform various data processing and operations with multimedia data by executing an operating system or an application program. The AP 610 may be implemented with a system on chip (SoC), for example. According to an embodiment of the present disclosure, the AP 610 may further include a graphic processing unit (GPU) (not shown).

The communication module 620 (for example, the communication interface 160) may perform data transmission through a communication with other electronic devices (for example, the electronic device 104 or the server 106) connected to the electronic device 601 via a network. According to an embodiment of the present disclosure, the communication module 620 may include a cellular module 621, a WiFi module 623, a BT module 625, a GPS module 627, an NFC module (not shown), and a radio frequency (RF) module 629.

The cellular module 621 may provide voice calls, video calls, text services, or internet services through a communication network (for example, LTE, LTE-A, CDMA, WCDMA, UMTS, WiBro, or GSM). The cellular module 621 may perform a distinction and authentication operation on an electronic device in a communication network by using a SIM (for example, the SIM card 624), for example. According to an embodiment of the present disclosure, the cellular module 621 may perform at least part of a function that the AP 610 provides. For example, the cellular module 621 may perform at least part of a multimedia control function.

According to an embodiment of the present disclosure, the cellular module 621 may further include a communication processor (CP). Additionally, the cellular module 621 may be implemented with SoC, for example. As shown in FIG. 6, components such as the cellular module 621 (for example, a CP), the memory 630, or the power management module 695 are separated from the AP 610, but according to an embodiment of the present disclosure, the AP 610 may be integral with some of the above-mentioned components (for example, the cellular module 621).

According to an embodiment of the present disclosure, the AP 610 or the cellular module 621 (for example, a CP) may load instructions or data, which are received from a nonvolatile memory or at least one of other components connected thereto, into a volatile memory and then may process them. Furthermore, the AP 610 or the cellular module 621 may store data received from or generated by at least one of other components in a nonvolatile memory.

Each of the WiFi module 623, the BT module 625, the GPS module 627, and the NFC module 628 may include a processor for processing data transmitted/received through a corresponding module. Although the cellular module 621, the WiFi module 623, the BT module 625, the GPS module 627, and the NFC module 628 are shown as separate blocks in FIG. 6, according to an embodiment of the present disclosure, some (for example, at least two) of the cellular module 621, the WiFi module 623, the BT module 625, the GPS module 627, and the NFC module 628 may be included in one integrated chip (IC) or an IC package. For example, at least some (for example, a CP corresponding to the cellular module 621 and a WiFi processor corresponding to the WiFi module 623) of the cellular module 621, the WiFi module 623, the BT module 625, the GPS module 627, and the NFC module 628 may be implemented with one SoC.

The RF module 629 may be responsible for data transmission, for example, the transmission of an RF signal. Although not shown in the drawings, the RF module 629 may include a transceiver, a power amp module (PAM), a frequency filter, or a low noise amplifier (LNA). Additionally, the RF module 629 may further include components for transmitting/receiving electromagnetic waves on a free space in a wireless communication, for example, conductors or conducting wires. Although the cellular module 621, the WiFi module 623, the BT module 625, the GPS module 627, and the NFC module 628 share one RF module 629 shown in FIG. 6, according to an embodiment of the present disclosure, at least one of the cellular module 621, the WiFi module 623, the BT module 625, the GPS module 627, and the NFC module 628 may perform the transmission of an RF signal through an additional RF module.

The SIM card 624 may be a card including a SIM and may be inserted into a slot formed at a specific position of an electronic device. The SIM card 624 may include unique identification information (for example, an integrated circuit card identifier (ICCID)) or subscriber information (for example, an IMSI).

The memory 630 (for example, the memory 60) may include an internal memory 632 or an external memory 634. The internal memory 632 may include at least one of a volatile memory (for example, dynamic random access memory (DRAM), static RAM (SRAM), synchronous DRAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, not and (NAND) flash memory, and not or (NOR) flash memory).

According to an embodiment of the present disclosure, the internal memory 632 may be a Solid State Drive (SSD). The external memory 634 may further include flash drive, for example, compact flash (CF), secure digital (SD), Micro-SD, Mini-SD, extreme digital (xD), or memory stick. The external memory 634 may be functionally connected to the electronic device 601 through various interfaces. According to an embodiment of the present disclosure, the electronic device 601 may further include a storage device (or a storage medium) such as a hard drive.

The sensor module 640 measures physical quantities or detects an operating state of the electronic device 601, thereby converting the measured or detected information into electrical signals. The sensor module 640 may include at least one of a gesture sensor 640A, a gyro sensor 640B, a pressure sensor 640C, a magnetic sensor 640D, an acceleration sensor 640E, a grip sensor 640F, a proximity sensor 640G, a color sensor 640H (for example, a red, green, blue (RGB) sensor), a bio sensor 640I, a temperature/humidity sensor 640J, an illumination sensor 640K, and an ultraviolet (UV) sensor 640M. Additionally/alternately, the sensor module 640 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 640 may further include a control circuit for controlling at least one sensor therein.

The input device 650 may include a touch panel 652, a (digital) pen sensor 654, a key 656, or an ultrasonic input device 658. The touch panel 652 may recognize a touch input through at least one of capacitive, resistive, infrared, or ultrasonic methods, for example. Additionally, the touch panel 652 may further include a control circuit. In the case of the capacitive method, both direct touch and proximity recognition are possible. The touch panel 652 may further include a tactile layer. In this case, the touch panel 652 may provide a tactile response to a user.

The (digital) pen sensor 654 may be implemented through a method similar or identical to that of receiving a user's touch input or an additional sheet for recognition. The key 656 may include a physical button, a touch key, an optical key, or a keypad, for example. The ultrasonic input device 658, as a device checking data by detecting sound waves through a microphone (for example, a microphone 688) in the electronic device 601, may provide wireless recognition through an input tool generating ultrasonic signals. According to an embodiment of the present disclosure, the electronic device 601 may receive a user input from an external device (for example, a computer or a server) through the communication module 620.

The display 660 (for example, the display 150) may include a panel 662, a hologram device 664, or a projector 666. The panel 662 may include a liquid-crystal display (LCD) or an active-matrix organic light-emitting diode (AMOLED). The panel 662 may be implemented to be flexible, transparent, or wearable, for example. The panel 662 and the touch panel 652 may be integral. The hologram 664 may show three-dimensional images in the air by using the interference of light. The projector 666 may display an image by projecting light on a screen. The screen, for example, may be placed inside or outside the electronic device 601. According to an embodiment of the present disclosure, the display 660 may further include a control circuit for controlling the panel 662, the hologram device 664, or the projector 666.

The interface 670 may include an HDMI 672, a USB 674, an optical interface 676, or a D-subminiature (sub) 678, for example. The interface 670 may be included in the communication interface 160 shown in FIG. 1, for example. Additionally/alternately, the interface 670 may include a mobile high-definition link (MHL) interface, an SD card/multimedia card (MMC) interface, or an infrared data association (IrDA) standard interface.

The audio module 680 may convert sound and electrical signals in both directions. At least some components of the audio module 680 may be included in the input/output interface 140 shown in FIG. 1, for example. The audio module 680 may process sound information inputted/outputted through a speaker 682, a receiver 684, an earphone 686, or the microphone 688.

The camera module 691 captures a still image and a video and may include at least one image sensor (for example, a front sensor or a rear sensor), a lens (not shown), an image signal processor (ISP) (not shown), or a flash (not shown) (for example, a light emitting diode (LED) or a xenon lamp).

The power management module 695 may manage the power of the electronic device 601. Although not shown in the drawings, the power management module 695 may include a power management integrated circuit (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. The wireless charging method, for example, may be implemented via a magnetic resonance method, a magnetic induction method, or an electromagnetic method. An additional circuit for wireless charging, for example, a circuit such as a coil loop, a resonant circuit, or a rectifier circuit, may be added.

A battery gauge (not shown) may measure the remaining amount of the battery 696, or a voltage, current, or temperature of the battery 396 during charging. The battery 696 may store or generate electricity and may supply power to the electronic device 601 by using the stored or generated electricity. The battery 696, for example, may include a rechargeable battery or a solar battery.

The indicator 697 may display a specific state of the electronic device 601 or part thereof (for example, the AP 610), for example, a booting state, a message state, or a charging state. The motor 696 may convert electrical signals into mechanical vibration. Although not shown in the drawings, the electronic device 601 may include a processing device (for example, a GPU) for mobile TV support. A processing device for mobile TV support may process media data according to the standards such as digital multimedia broadcasting (DMB), digital video broadcasting (DVB), or media flow.

According to any one of the above-mentioned technical solutions of the present disclosure, various embodiments of the present disclosure generate a preview image on the basis of a user input, which is received from a user of a first electronic device, for a screen setting of a second electronic device and then provide the preview image to the user. That is, a user may be provided with a convenience for checking the preview image on the screen setting of the second electronic device only with the first electronic device without the second electronic device.

Each of the above-mentioned components of the electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some of components in an electronic device according to an embodiment of the present disclosure are configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component, may be a minimum unit performing at least one function or part thereof or may be implemented mechanically or electronically. For example, a "module" according to various embodiments of the present disclosure may include at least one of an application-specific IC (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in non-transitory computer-readable storage media. When at least one processor (for example, the processor 120) executes an instruction, it may perform a function corresponding to the instruction. The non-transitory computer-readable storage media may include the memory 130, for example. At least part of a programming module may be implemented (for example, executed) by processor 120, for example. At least part of a programming module may include a module, a program, a routine, sets of instructions, or a process to perform at least one function, for example.

The non-transitory computer-readable storage media may include Magnetic Media such as a hard disk, a floppy disk, and a magnetic tape, Optical Media such as Compact Disc ROM (CD-ROM) and DVD, Magneto-Optical Media such as Floptical Disk, and a hardware device especially configured to store and perform a program instruction (for example, a programming module) such as ROM, RAM, and flash memory. Additionally, a program instruction may include high-level language code executable by a computer using an interpreter in addition to machine code created by a complier. The hardware device may be configured to operate as at least one software module to perform an operation of this disclosure and vice versa.

A module of a programming module according to various embodiments of the present disclosure may include at least one of the above-mentioned components or additional other components. Or, some programming modules may be omitted. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a first electronic device to display a preview image, the method comprising:
   receiving, by the first electronic device, a user input for setting a screen of a second electronic device;
   transmitting, by the first electronic device, setting information based on the user input to the second electronic device;
   receiving, by the first electronic device, the preview image, based on the setting information, from the second electronic device; and
   displaying, by the first electronic device, the received preview image,
   wherein the preview image is for the screen of the second electronic device.

2. The method of claim 1, wherein the preview image is for a screen set in the second electronic device based on the user input.

3. The method of claim 1, wherein the user input is to set at least one of a date, a font, and a color displayed on the screen of the second electronic device.

4. The method of claim 1, wherein the first electronic device is a smartphone and the second electronic device is a wearable device.

5. The method of claim 4, wherein the first electronic device and the second electronic device are paired with each other by using identification information for a single user.

6. A method of a second electronic device to generate a preview image, the method comprising:
   receiving, by the second electronic device, setting information from a first electronic device;
   generating, by the second electronic device, a preview image based on the received setting information; and
   transmitting, by the second electronic device, the generated preview image to the first electronic device.

7. The method of claim 6, wherein the setting information is an extensible markup language (xml) file for changing a screen of the second electronic device.

8. The method of claim 7, further comprising:
   setting the screen of the second electronic device based on the received setting information.

9. The method of claim 8, wherein the preview image is generated by capturing the set screen.

10. The method of claim 6, further comprising:
    displaying, via the first electronic device, the preview image.

11. The method of claim 10, wherein the displaying of the preview image further comprises displaying the preview image in an application for controlling graphical elements on the screen of the second electronic device.

12. The method of claim 10, further comprising:
    receiving, from the first electronic device, a request for setting the preview image as the screen of the second electronic device; and
    setting the screen of the second electronic device in response to the received request.

13. The method of claim 6, wherein the first electronic device and the second electronic device communicate via a peer-to-peer connection.

14. A first electronic device displaying a preview image, the first electronic device comprising:
    an input device configured to receive a user input for setting a screen of a second electronic device;
    at least one processor configured to generate setting information on the screen of the second electronic device based on the user input;
    a transceiver configured to:
       transmit the generated setting information to the second electronic device, and
       receive the preview image, based on the generated setting information, from the second electronic device; and
    a display configured to display the received preview image,
    wherein the preview image is for the screen of the second electronic device.

15. The first electronic device of claim 14, wherein the generated setting information comprises at least one of identification information of the second electronic device or user identification information of the second electronic device.

* * * * *